(12) United States Patent
Francavilla

(10) Patent No.: US 8,641,422 B2
(45) Date of Patent: Feb. 4, 2014

(54) BONE AUGMENTATION TRAINING SYSTEM

(76) Inventor: Vincent Francavilla, Buffalo, NY (US)

( * ) Notice: Subject to any disclaimer, the term of this patent is extended or adjusted under 35 U.S.C. 154(b) by 43 days.

(21) Appl. No.: 13/527,760

(22) Filed: Jun. 20, 2012

(65) Prior Publication Data

US 2013/0244214 A1   Sep. 19, 2013

Related U.S. Application Data

(60) Provisional application No. 61/611,161, filed on Mar. 15, 2012.

(51) Int. Cl.
*G09B 23/28* (2006.01)

(52) U.S. Cl.
USPC ......................................................... 434/263

(58) Field of Classification Search
USPC .......... 434/262, 263, 264, 267, 270, 272, 274
See application file for complete search history.

(56) References Cited

U.S. PATENT DOCUMENTS

| | | | | |
|---|---|---|---|---|
| 4,436,684 A | * | 3/1984 | White | 264/138 |
| 5,120,229 A | * | 6/1992 | Moore et al. | 434/263 |
| 5,320,529 A | * | 6/1994 | Pompa | 433/76 |
| 6,524,105 B2 | * | 2/2003 | Raffeiner | 433/213 |
| 7,121,832 B2 | * | 10/2006 | Hsieh et al. | 434/262 |
| 8,376,754 B2 | * | 2/2013 | Segal et al. | 434/263 |
| 8,382,686 B2 | * | 2/2013 | Gutman et al. | 600/595 |
| 8,465,291 B2 | * | 6/2013 | Bell | 434/263 |

* cited by examiner

*Primary Examiner* — Kurt Fernstrom
(74) *Attorney, Agent, or Firm* — Paul T. Lavoie

(57) ABSTRACT

The disclosed apparatuses, methods, and systems provide for simulations of real-life bone graft procedures. One embodiment is a model that includes a base in the shape of at least a portion of a maxillary or mandibular dental arch, and includes a defect on its surface. The model also includes a multi-layer tissue model configured to overlay at least a portion of the base in a covering relationship with the defect and surrounding tissue. The multi-layer tissue model includes a gingival simulating layer, connective tissue simulating layer, and two adhesive layers. The first of the two adhesive layers connects the connective tissue simulating layer to the gingival simulating layer, and the second adhesive layer, affixed to the connective tissue simulating layer opposite the first layer, is configured to adhere the multi-layer tissue model to the base. The multi-layer tissue model also includes a removable backing covering the second adhesive layer.

20 Claims, 8 Drawing Sheets

BONE GRAFTING KIT

| CLASSIFICATION | MODELS | PATTERNS |
|---|---|---|
| 1. Category 1.<br>Bone Defect:<br>  Extraction Socket<br>Procedure:<br>  Socket Preservation | 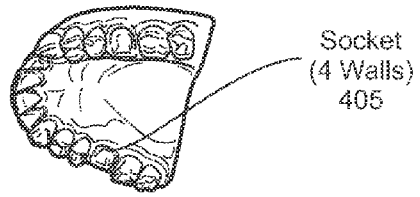 Socket (4 Walls) 405 | 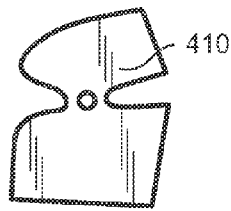 410 |
| 2. Category 2.<br>Bone Defect:<br>  Socket<br>  3 Walls Intact<br>  (Posterior) | 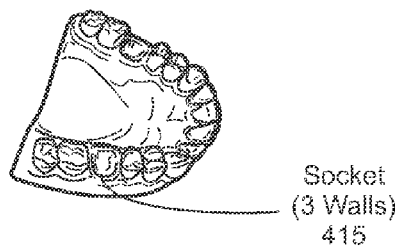 Socket (3 Walls) 415 | 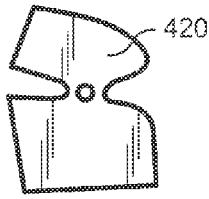 420 |
| 3. Category 3.<br>Bone Defect:<br>  Socket<br>  3 Walls Intact<br>  (Anterior) | 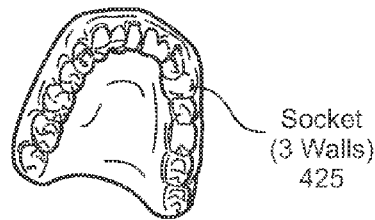 Socket (3 Walls) 425 | 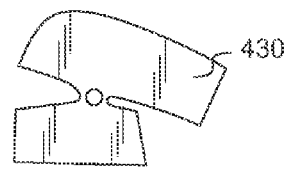 430 |
| 4. Category 4.<br>Bone Defect:<br>  Anterior Esthetic<br>  Zone - Extensive<br>  Area of Bone Loss | 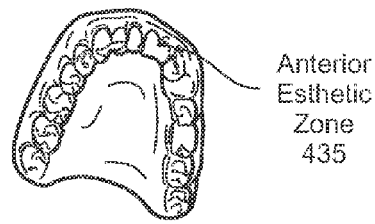 Anterior Esthetic Zone 435 | 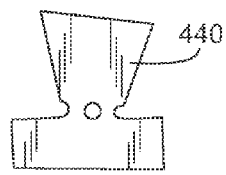 440 |
| 5. Category 5.<br>Bone Defect:<br>  Posterior<br>  Bone Loss<br>  (Upper)<br>  <u>external</u> bone grafting | 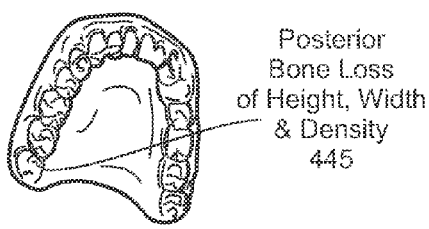 Posterior Bone Loss of Height, Width & Density 445 | 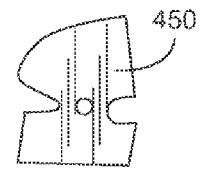 450 |

Fig. 4A

BONE GRAFTING KIT

| CLASSIFICATION | MODELS | PATTERNS |
|---|---|---|
| Category 6. and 7.<br>Bone Defect:<br>  Posterior<br>  Bone Loss<br>  (Upper)<br>Advanced Bone<br>  Augmentation Kit:<br>    Right and Left<br>  Sinus Lift procedure<br>  to achieve internal<br>  bone grafting | 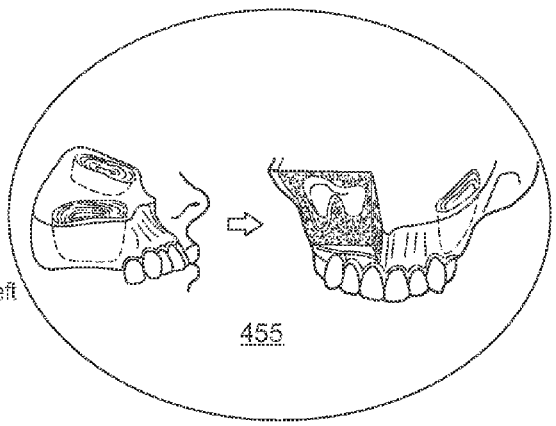<br>455 | 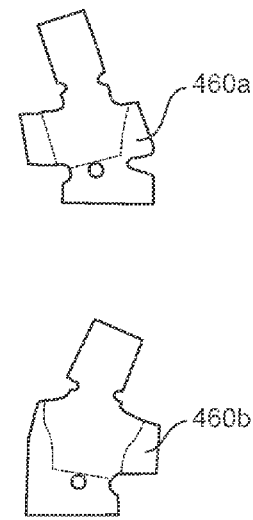<br>460a<br><br>460b |
| Category 8.<br>Bone Defect:<br>  Lower Ridge Defect<br><br>Advanced Bone<br><br>Augmentation Kit:<br>  Block Graft<br>   for Ridge Defect | 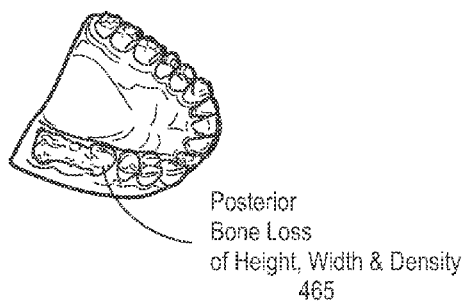<br>Posterior<br>Bone Loss<br>of Height, Width & Density<br>465 | 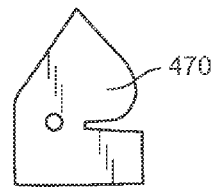<br>470 |

Fig. 4B

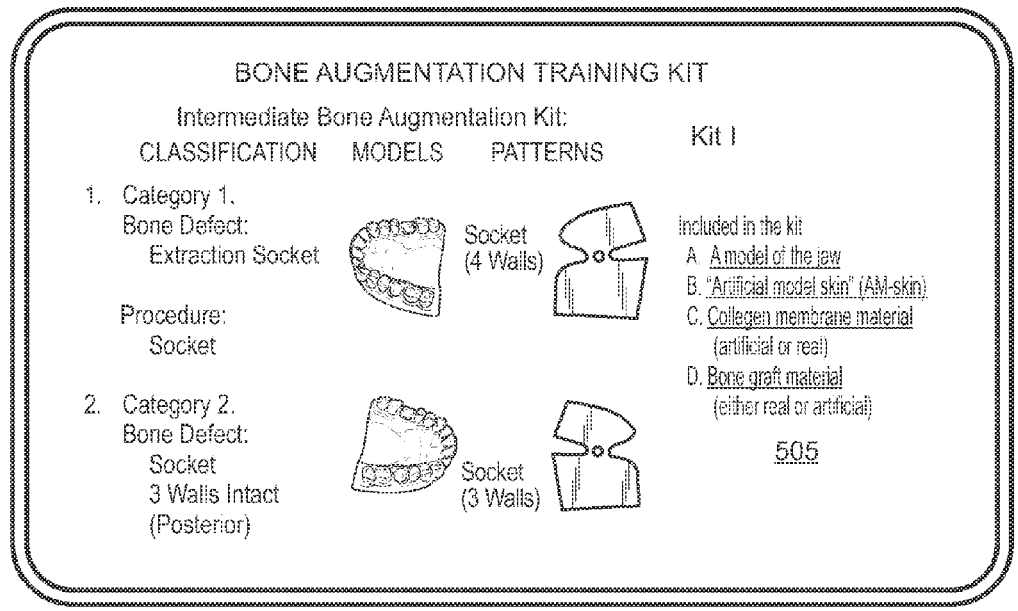
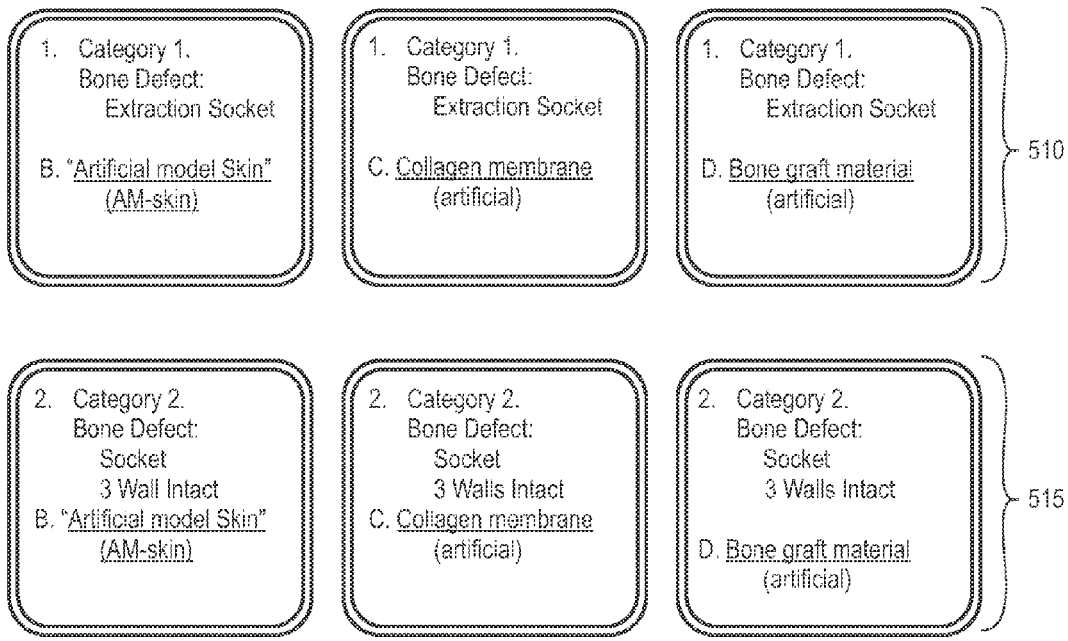
Fig. 5A

BONE AUGMENTATION TRAINING SYSTEM

RELATED APPLICATION

This application claims the benefit of U.S. Provisional Application No. 61/611,161, filed on Mar. 15, 2012. The entire teachings of the above application are incorporated herein by reference.

BACKGROUND OF THE INVENTION

Bone grafting is a surgical procedure that replaces missing bone. Bone grafts may be autologous, which are grafts harvested from a patient's own body, allograft, which are cadaveric grafts obtained from a bone bank), or synthetic grafts. Dental bone grafts may be performed to reverse bone loss or destruction caused by, for example, periodontal disease or trauma. Some bone grafts are performed to rebuild bone structure to support dental implants. Membranes may be used to stabilize the bone graft as it heals. Use of membranes also helps prevent gum tissue from displacing the bone graft before it matures. Sinus lifts are bone grafting procedures for patients with bone loss in the upper jaw (maxilla). The bone graft material is placed in the space between the sinus membrane and sinus bony floor to help the body grow bone and form a thicker sinus floor. Once the bone graft site has healed, the jaw bone below the sinus may be used for dental implants. These bone graft procedures are highly-complex procedures requiring a large amount of training on behalf of an oral surgeon before he can proficiently operate on a human patient.

SUMMARY OF THE INVENTION

Because bone graft procedures are complex and require extensive training, replicating as close as possible the real-life conditions for the procedures is highly-desirable. The disclosed apparatuses, methods, and systems provide for simulations of real-life bone graft procedures. One embodiment for simulating bone graft procedures is a model for practicing bone graft protocols in the maxillary and/or mandibular arch. The model includes a base in the shape of at least a portion of a maxillary dental arch or mandibular dental arch, and includes a defect on its surface. The model also includes a multi-layer tissue model configured to overlay at least a portion of the base in a covering relationship with the defect and surrounding tissue. The multi-layer tissue model includes a gingival simulating layer, connective tissue simulating layer, and two adhesive layers. The first of the two adhesive layers connects the connective tissue simulating layer to the gingival simulating layer, and the second adhesive layer, affixed to the connective tissue simulating layer opposite the first layer, is configured to adhere the multi-layer tissue model to the base. The multi-layer tissue model also includes a removable backing covering the second adhesive layer.

Further embodiments may include bone graft material compatible with the defect. In such embodiments, the bone graft material may be in the form of a fluid-powder, putty material, or solid piece sized and configured to be compatible with the defect. In some embodiments, the base is molded composite material. The second adhesive layer may be a pressure-sensitive adhesive having a peel force, relative to the surface of the base, that simulates a peel force of actual connective tissue to bone. Further embodiments may include a barrier membrane simulating material configured to cover an opening over the defect. Some defects simulated with the model may be, for example, an extraction socket, where protocol to be practiced is socket preservation; a bone defect resulting from tooth loss, where the protocol to be practiced is maxillary or mandibular reconstruction; a bone defect resulting from tooth loss, where the protocol to be practiced is a sinus lift procedure; or a bone defect resulting from tooth loss, where the protocol to be practiced is a block graft procedure. In any of the embodiments, a supportive cradle sized and configured to support the base in an operation-simulating position may be employed.

Another example embodiment is a method of practicing bone graft protocols in the maxillary arch and/or mandibular dental arch. The method includes providing a base in the shape of at least a portion of a maxillary dental arch or mandibular dental arch, where the base includes a defect on its surface. The method further includes covering the defect and surrounding tissue of the base with a multi-layer tissue model. As described above, the multi-layer tissue model includes a gingival simulating layer, connective tissue simulating layer, and first and second adhesive layers. The method further involves incising the multi-layer tissue model over the defect, flapping-back the multi-layer tissue model to expose the defect, introducing bone graft material into the defect to repair the defect, cutting a barrier membrane simulator and covering the repaired defect with the barrier membrane simulator, and suturing the barrier membrane simulator to the multi-layer tissue model.

Yet another example embodiment is a system for bone augmentation training. The system includes a model of a human jaw, artificial skin, collagen membrane material, and bone graft material. The model of the human jaw replicates at least one category of bone deficiency in a given location of the jaw. The artificial skin is capable of being affixed to an area of the model representing the bone deficiency. The artificial skin includes a foam layer, a latex layer affixed to one side of the foam layer, and an adhesive backing affixed to the opposite side of the foam layer. The systems may also include instructions for using the model, artificial skin, collagen membrane material, and bone graft material.

In many embodiments, the artificial skin allows incision by a scalpel to approximate a consistency of human skin, and is capable of being sutured with a surgical needle and suture material, also to approximate strength and elasticity of human skin. A portion of the artificial skin may be capable of being removed from the model to simulate a flap of human skin, and the artificial skin may be capable of being removed from the model to allow reuse of the model. To further assist an oral surgeon to efficiently practice bone augmentation, the artificial skin may be pre-cut to a pattern that corresponds to the area of the model representing the bone deficiency.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4A and 4B illustrate various models for practicing bone graft protocols, according to example embodiments of the present invention.

FIGS. 5A-5C illustrate example systems for bone augmentation training, according to example embodiments of the present invention.

DETAILED DESCRIPTION OF THE INVENTION

A description of example embodiments of the invention follows.

Bone graft procedures are complex and require extensive training; thus, replicating as close as possible the real-life conditions for the procedures is highly-desirable. The disclosed apparatuses, methods, and systems provide for simulations of real-life bone graft procedures.

Figure 1:
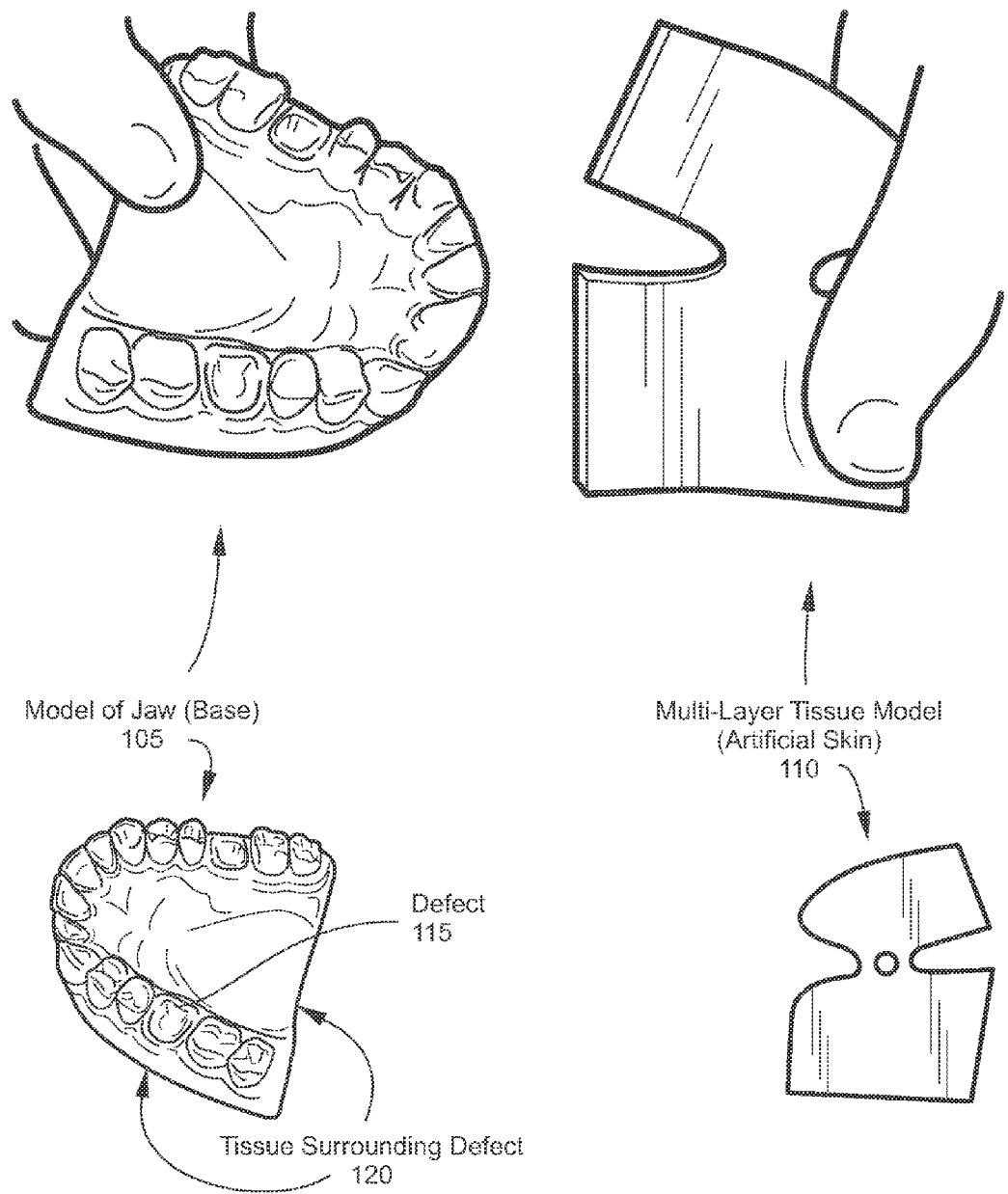
FIG. 1 illustrates components of a model for practicing bone graft protocols in the maxillary and/or mandibular arch of a human jaw, according to an example embodiment of the present invention, including a base and multi-layer tissue model.

FIG. 1 illustrates components of a model for practicing bone graft protocols in the maxillary and/or mandibular arch of a human jaw, according to an example embodiment of the present invention. The model includes a base (model of a jaw) 105 and multi-layer tissue model (artificial skin) 110. The base 105 is in the shape of at least a portion of a maxillary dental arch or mandibular dental arch, and includes a defect 115 on its surface. In the example embodiment of FIG. 1, the base 105 is in the shape of a mandibular dental arch, and the defect 115 is a socket with four intact walls. The multi-layer tissue model 110 is configured to overlay a portion of the base 105 in a covering relationship with the defect 115 and surrounding tissue 120.

One example purpose of the disclosed models and kits is to offer the opportunity for dentists and dental students to perfect many of the techniques necessary for bone grafting procedures in preparation for successful implant surgery. Bone grafting procedures allows for augmentation of the bone, which improves both the quality and quantity of bony support for the implant. Typically, the first step in assessing the feasibility of implant therapy is to determine information concerning the condition at a bony defect site, such as, for example, height, width, and density of the bone, among other factors. This information about bone condition can lead to the selection of an appropriate procedure that best fits one of the example categories of bone grafting model kits with its corresponding proper training regimen. The example kits, described in more detail below, represent increasingly difficult aspects of bone augmentation, ranging from introductory, to intermediate, to advanced grafting methods. Each model in the kit corresponds to a description in an accompanying protocol manual deemed best for successful bone augmentation procedures.

Included in the kits may be the following items. One or more models of a jaw, replicating certain categories of bone loss, in given locations of the mouth. "Artificial model skin" (AM-skin) which can be easily affixed to the areas on the model that replicate the various examples of bone deficiency. Adhesive backing on the skin can be exposed by peeling off a protective paper backing. The artificial skin has properties that make it possible to practice cutting incisions necessary for flap procedures to expose bone and then suturing procedures to approximate the cut edges back together again. Thus, the entire cycle of bone augmentation can be replicated by the dentist or dental student. Once a cycle is completed, the artificial skin may be peeled off and the model is ready to receive a new covering of artificial skin to begin the practice cycle again. This can be done as many times as necessary to gain the skill and confidence to prepare for the clinical procedure. The kits may also include a collagen membrane material (artificial or real), bone graft material (either real or artificial), and an instruction manual for the specific protocols applicable to the training kit.

Figure 2:
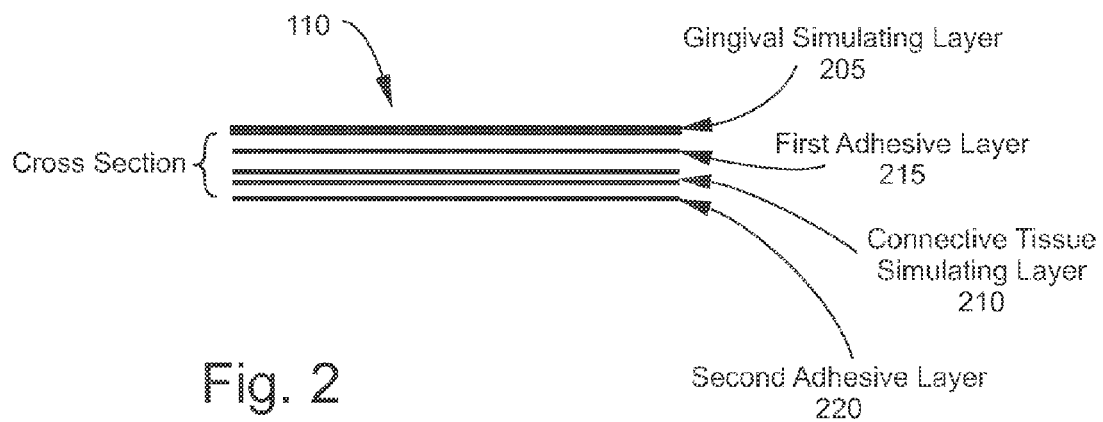
FIG. 2 illustrates a multi-layer tissue model of an example embodiment of the present invention.

FIG. 2 illustrates a multi-layer tissue model (artificial skin) 110 of an example embodiment of the present invention. The multi-layer tissue model 110 includes a gingival simulating layer 205, connective tissue simulating layer 210, and two adhesive layers 215, 220. The first adhesive layer 215 connects the connective tissue simulating layer 210 to the gingival simulating layer 205. The second adhesive layer 220 is affixed to the connective tissue simulating layer 210 opposite the first adhesive layer 215, and is configured to adhere the multi-layer tissue model 110 to the base 105. The multi-layer tissue model also includes a removable backing (not shown) covering the second adhesive layer 220. A foam-latex material may be used to satisfy the multi-layer tissue model (artificial skin) 110 of the model. Such a foam-latex material may be made by bonding together a 2 mm think sheet of foam, having a double-sided adhesive backing together with a 0.01 thickness of latex sheet. Variations in thickness may be made without materially departing from the scope of the present invention. The result is a foam-latex material that has one side with an adhesive that can be exposed by peeling-off a protective paper layer. The foam-latex material may be cut into several different patterns. A pattern sheet of approximately 9"×7" in size may be supplied for each type of shape so that multiple cuttings can be made using provided templates. In addition, separate patterns, already cut-out, may accompany each of the pattern sheets. The skin 110 may also be lightly sprayed with a soft pink acrylic to give a livelier, more realistic color.

As described above, construction of the multi-layer tissue model (artificial skin) 110 may include a 0.01 mm thickness of latex (as the gingival simulating layer 205) bonded to a 2 mm thickness sheet of foam (as the connective tissue simulating layer 210). This combination of materials imparts a number of unique properties to the artificial skin 110. The foam layer allows the incising of the material with a standard scalpel to approximate very closely the consistency and resistance of natural human skin. This allows health practitioners to practice surgical procedures as realistically as possible to develop their skills. The latex layer of the artificial skin 110 imparts strength and elasticity so that it can be sutured with a standard surgical needle and suture material, which, again, closely approximates human skin. Suturing skills can be improved by practicing on this material. Another unique characteristic of this artificial model skin 110 is an adhesive backing allowing it to adhere to any anatomical model as a "skin" layer. The adhesive backing on the skin can be exposed by peeling off a protective paper backing. This allows the material to stay in place while surgical procedures are practiced. Another unique characteristic of the artificial model skin 110 is the ability to peel-back part of the skin 110 to simulate a flap of skin. Additionally, the skin 110 may be removed entirely, allowing reuse of the model base 105 and a new pattern for any number of practice cycles. The artificial skin 110 can be supplied in a number of pre-cut patterns that correspond to any given bony area. This gives both the appearance of real skin and the adaptability to many model contours. Further, the adhesive side 220 of the skin 110 can be exposed by peeling off the protective paper backing all at once, or in sections for more initial maneuverability on the model base 105.

Figure 3:
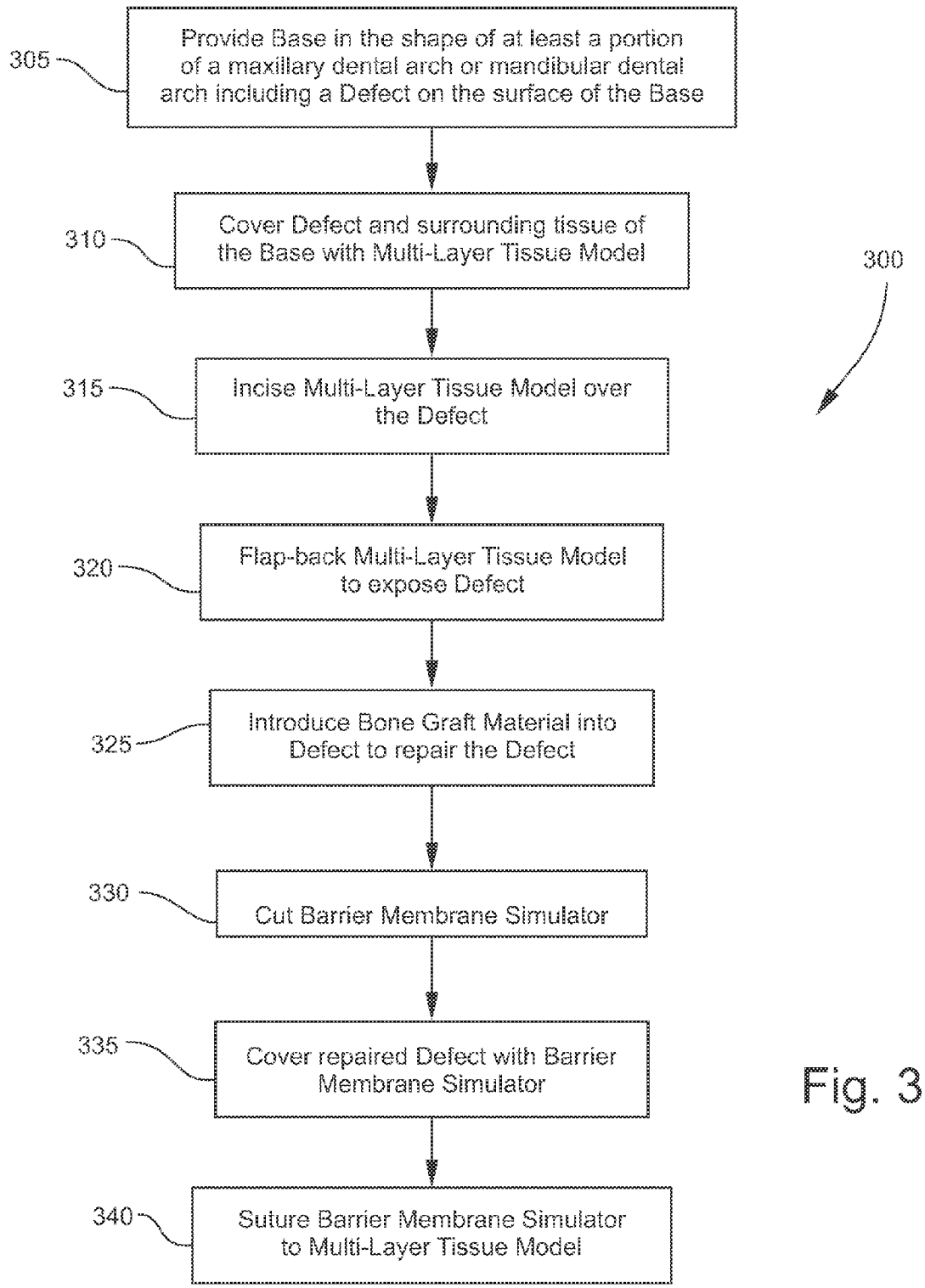
FIG. 3 illustrates a method of practicing bone graft protocols in the maxillary arch and/or mandibular dental arch of a human jaw, according to an example embodiment of the present invention.

FIG. 3 illustrates a method 300 of practicing bone graft protocols in the maxillary arch and/or mandibular dental arch of a human jaw, according to an example embodiment of the present invention. The method 300 includes providing (305) a base in the shape of at least a portion of a maxillary dental arch or mandibular dental arch, where the base includes a defect on its surface. The method further includes covering (310) the defect and surrounding tissue of the base with a multi-layer tissue model. The method further involves incising (315) the multi-layer tissue model over the defect, flapping-back (320) the multi-layer tissue model to expose the defect, introducing (325) bone graft material into the defect to repair the defect, cutting (330) a barrier membrane simulator and covering (335) the repaired defect with the barrier membrane simulator, and suturing (340) the barrier membrane simulator to the multi-layer tissue model.

FIGS. 4A and 4B illustrate various models for practicing bone graft protocols, according to example embodiments of the present invention. The depicted models represent example categories of bone loss in the jaw. The dental models are accurate replicas of bone defect areas on upper or lower human jaws and are anatomically correct as far as can be achieved. The example categories of bone loss describe some of the most commonly recognized categories of human bony defects of the jaw resulting from tooth loss. The bone defect 405 of Category 1 is an extraction socket with four walls intact, similar to the defect shown in FIG. 1. The procedure corresponding to the defect of Category 1 is socket preservation, and pattern 410 is used to practice the procedure on the model. The bone defect 415 of Category 2 is a socket with three or fewer walls intact (posterior area of the lower jaw), the corresponding procedure is use of specially cut collagen membrane to replace the missing bony walls, and pattern 420 is used to practice the procedure on the model. The bone defect 425 of Category 3 is a socket with three or fewer walls intact (anterior area of the upper jaw), the corresponding procedure is use of specially cut collagen membrane to replace the missing bony walls, and pattern 430 is used to practice the procedure on the model. The bone defect 435 of Category 4 is extensive area of bone loss in anterior aesthetic zone, the corresponding procedure is use of a large collagen membrane to cover large particle bone graft material, and pattern 440 is used to practice the procedure on the model. The bone defect 445 of Category 5 is extensive area of posterior bone loss, the corresponding procedure is a "tenting procedure" to protect a large area of bone graft material, and pattern 450 is used to practice the procedure on the model. The bone defect 455 of Categories 6 and 7 is posterior bone loss of the upper-jaw, the corresponding procedure is a sinus lift procedure to achieve internal bone grafting, and either pattern 460a or 460b is used to practice the procedure on the model, depending on the side of the jaw. The bone defect 465 of Category 8 is a lower ridge defect, the corresponding procedure is a block graft, and pattern 470 is used to practice the procedure on the model. The depicted model bases, together with the patterns of artificial skin, offer unique opportunities to replicate accurate human jaw bone deficiencies for the purpose of training exercises.

Figure 5B:
Figure 5C:
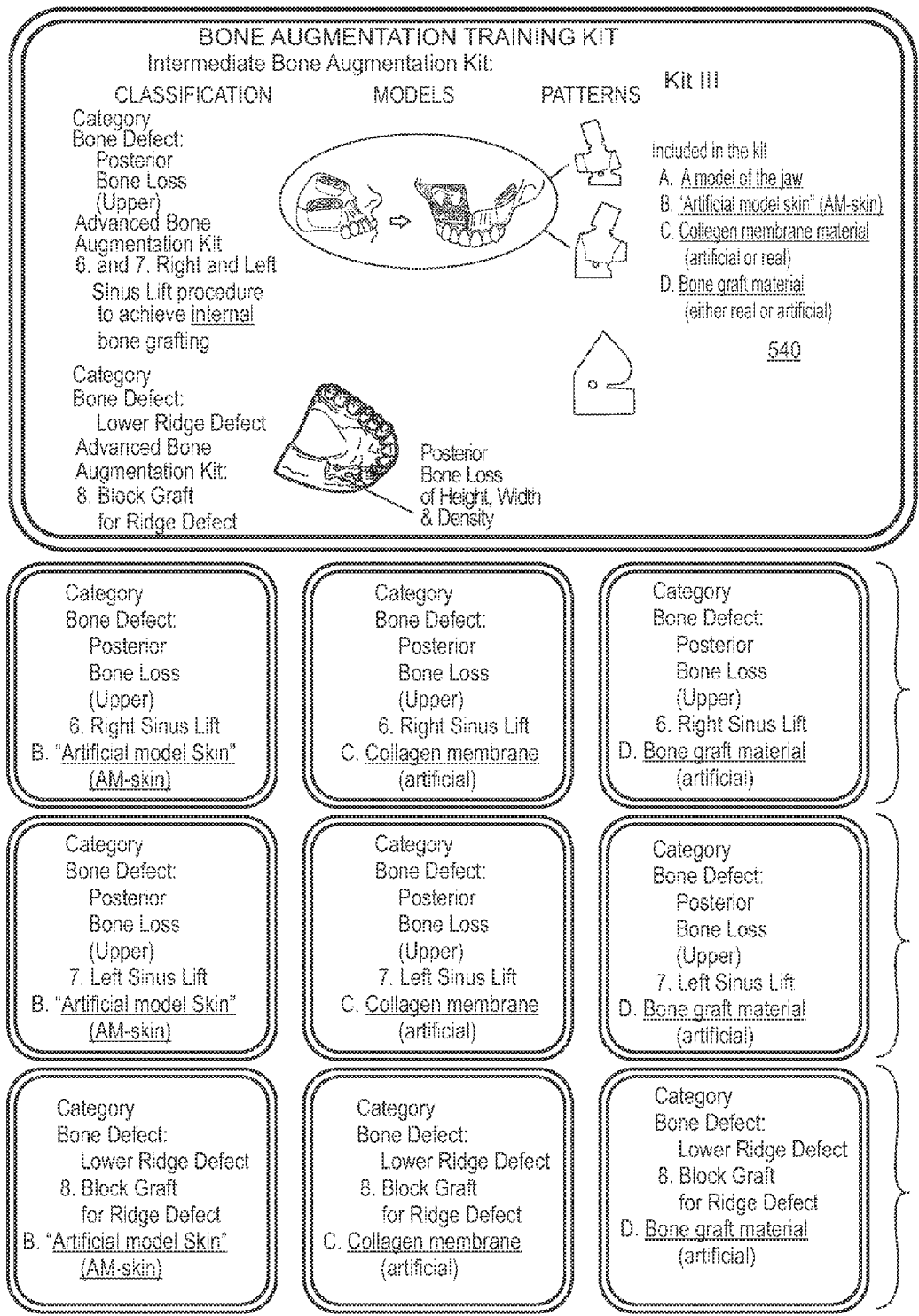

FIGS. 5A-5C illustrate example systems (or kits) for bone augmentation training, according to example embodiments of the present invention. The example kits, described below, represent increasingly difficult aspects of bone augmentation, ranging from introductory, to intermediate, to advanced grafting methods. Each model in a kit corresponds to a description in an accompanying protocol manual deemed best for successful bone augmentation procedures. An example of an introductory bone augmentation kit 505 is shown in FIG. 5A and includes components to practice an extraction socket preservation technique 510, with four walls intact, and an extraction socket preservation technique 515, with three or less walls intact. An example of an intermediate bone augmentation kit 520 is shown in FIG. 5B and includes components to practice procedures for a bony defect in a cuspid area with three walls intact 525, a bony defect in an aesthetic anterior area involving more than one tooth space 530, and a bony defect in a posterior maxillary area using a "tenting procedure" to achieve external bone grafting results 535.

Instructions for placing the artificial modeling skin 110 for the example introductory and intermediate kit embodiments 505, 520 may be as follows:
1. Use a pattern guide supplied with the kit. The pattern guide shows a black circle on the artificial skin that corresponds to the bony defect area. Place the artificial skin pattern so that it fits over the artificially created bony defect between any existing teeth on either side, using the black circle area as a guide. Push down the artificial skin until it settles into the area and around any adjacent teeth.
2. Wrap the buccal extension of the pattern around the model at the gingival level of the teeth and press the pattern firmly so it adheres to the model base.
3. Settle the palatal extension of the artificial skin so that it also approximates the gingival height on the model teeth. Press the pattern firmly against the model base so that it will adhere tightly and not come loose during the practice of surgical techniques.
4. Follow the step-by-step protocol contained in the instruction manual to practice the cycles of surgical procedures. Once finished, the artificial skin can be removed and the next pattern can be placed to begin another practice cycle. Using the artificial skin in conjunction with the model base, a series of practice surgical procedures can be repeated until the clinician is comfortable with the entire process.

An example of an advanced bone augmentation kit 540 is shown in FIG. 5C and includes components to practice procedures for a right and left sinus lifts to achieve internal bone grafting results 545, 550, and a block graft procedure for a ridge defect 555.

Instructions for placing the artificial modeling skin 110 for the example advanced kit embodiment 540 may be as follows:
A. For a Sinus Lift
1. Beginning with the right-side of the sinus lift model, place the artificial skin so that the palatal extension aligns with the groove on the model palate area. This will align the pattern so that it fits over the artificially created bony defect. The black circle on the pattern guide can help identify this defect area. Push down the artificial skin progressively until it settles into the bony defect area on the model (the alveolar ridge).
2. Progressively wrap the pattern around the buccal aspect of the model and up and over to the artificially created maxillary sinus cavity.
3. Tape three thicknesses of tongue depressors together and use this as a ramming tool for compacting the artificial skin into the cavity representing the maxillary sinus. Make sure the artificial skin adheres to the side walls and base of the cavity so that it will act as an artificial Schneiderian membrane.
4. The surgical procedure may then be practiced according to the protocol in the manual. Once finished, the artificial skin can be removed and the next pattern can be placed to begin another practice cycle. Using the artificial skin in conjunction with the model base, a series of practice surgical procedures can be repeated until the clinician is comfortable with the entire process.

5. The step-by-step protocol contained in the instruction manual will help to visualize the surgical procedures from both a side view and a sagital, cross-section view.
6. It should be noted that the sinus model offers two opportunities for practicing cutting through bone to reach the Schneiderian membrane, one on the right-side sinus and one on the left-side sinus. Once the surface has been cut through and the window opened, the remaining "trap door" piece can be held back in place by using tape on the inside of the sinus wall, with the adhesive side facing the wall that the Schneiderian membrane would rest on. Then the next cycle of practicing can resume without the need to "cut" the bone away. In the step that replicates the reflecting of the Schneiderian membrane, the taped "try door" piece can be reflected along with the rest of the artificial Schneiderian membrane.

B. For a Block Graft

1. Use the pattern guide supplied with the kit. It shows a black circle on the artificial skin that corresponds to the bony defect area. Place the artificial skin pattern so that it fits over the artificially created bony defect between any existing teeth on either side, using the black circle area as a guide. Push down the artificial skin until it settles into that area and around any adjacent teeth.
2. Wrap the buccal extension of the pattern around the model at the gingival level of the teeth and press the pattern firmly so it adheres to the model base.
3. Settle the palatal extension of the AM-skin so that it also approximates the gingival height on the model teeth. Press the pattern firmly against the model so that it will adhere tightly and not come loose during the practice of surgical techniques.
4. Follow the step-by-step protocol contained in the instruction manual to practice the cycles of surgical procedures. Once finished, the artificial skin can be removed and the next pattern can be placed to begin another practice cycle. Using the artificial skin in conjunction with the model base, a series of practice surgical procedures can be repeated until the clinician is comfortable with the entire process.

While this invention has been particularly shown and described with references to example embodiments thereof, it will be understood by those skilled in the art that various changes in form and details may be made therein without departing from the scope of the invention encompassed by the appended claims.

What is claimed is:

1. A model for practicing bone graft protocols in the maxillary and/or mandibular arch, the model comprising:
   a base in the shape of at least a portion of a maxillary dental arch or mandibular dental arch including a defect on the surface of the base; and
   a multi-layer tissue model configured to overlay at least a portion of the base in a covering relationship with the defect and surrounding tissue, the multi-layer tissue model including a gingival simulating layer, a connective tissue simulating layer, a first adhesive layer connecting the connective tissue simulating layer to the gingival simulating layer, a second adhesive layer affixed to the connective tissue simulating layer opposite the first layer, the second adhesive layer configured to adhere the multi-layer tissue model to the base, and a removable backing covering the second adhesive layer.
2. The model of claim 1 further including bone graft material compatible with the defect.
3. The model of claim 2 wherein the bone graft material is in the form of a fluid-powder or a putty material.
4. The model of claim 2 wherein the bone graft material is a solid piece sized and configured to be compatible with the defect.
5. The model of claim 1 wherein the second adhesive layer is a pressure-sensitive adhesive having a peel force relative to the surface of the base, the adhesive simulating a peel force of actual connective tissue to bone.
6. The model of claim 1 wherein the defect simulates an extraction socket and the bone graft protocol to be practiced is socket preservation.
7. The model of claim 1 wherein the defect simulates a bone defect resulting from tooth loss and the bone graft protocol to be practiced is maxillary or mandibular reconstruction.
8. The model of claim 1 wherein the defect simulates a bone defect resulting from tooth loss and the bone graft protocol to be practiced is a sinus lift procedure.
9. The model of claim 1 wherein the wherein the defect simulates a bone defect resulting from tooth loss and the bone graft protocol to be practiced is a block graft procedure.
10. A method of practicing bone graft protocols in the maxillary arch and/or mandibular dental arch, the method comprising:
    providing a base in the shape of at least a portion of a maxillary dental arch or mandibular dental arch including a defect on the surface of the base;
    covering the defect and surrounding tissue of the base with a multi-layer tissue model, the multi-layer tissue model including a gingival simulating layer, a connective tissue simulating layer, a first adhesive layer connecting the gingival simulating layer to the connective tissue simulating layer, a second adhesive layer affixed to the connective tissue simulating layer opposite the first layer, the second adhesive layer adhering the multi-layer tissue model to the base;
    incising the multi-layer tissue model over the defect;
    flapping-back the multi-layer tissue model to expose the defect;
    introducing bone graft material into the defect to repair the defect;
    cutting a barrier membrane simulator;
    covering the repaired defect with the barrier membrane simulator; and
    suturing the barrier membrane simulator to the multi-layer tissue model.
11. A method as in claim 10 further including removing the multi-layer tissue model from the base and covering the defect and surrounding tissue of the base with a new multi-layer tissue model.
12. A method as in claim 10 wherein the defect simulates an extraction socket and further comprising performing a socket preservation bone graft protocol.
13. A method as in claim 10 wherein the defect simulates a bone defect resulting from tooth loss and further comprising performing a maxillary or mandibular reconstruction bone graft protocol.
14. A method as in claim 10 wherein the defect simulates a bone defect resulting from tooth loss and further comprising performing a sinus lift procedure.
15. A method as in claim 10 wherein the defect simulates a bone defect resulting from tooth loss and further comprising performing a block graft procedure.
16. A system for bone augmentation training, the system comprising:
    a model of a human jaw replicating at least one category of bone deficiency in a given location of the jaw;

artificial skin capable of being affixed to an area of the model representing the bone deficiency, the artificial skin including a foam layer, a latex layer affixed to one side of the foam layer, and an adhesive backing affixed to the opposite side of the foam layer;

collagen membrane material; and bone graft material.

17. A system as in claim 16 wherein the artificial skin allows incision by a scalpel to approximate a consistency of human skin, and is capable of being sutured with a surgical needle and suture material to approximate strength and elasticity of human skin.

18. A system as in claim 16 wherein a portion of the artificial skin is capable of being removed from the model to simulate a flap of human skin, and wherein the artificial skin is capable of being removed from the model to allow reuse of the model.

19. A system as in claim 16 wherein the artificial skin is cut to a pattern that corresponds to the area of the model representing the bone deficiency.

20. A system as in claim 16 further including instructions for using the model, artificial skin, collagen membrane material, and bone graft material.

\* \* \* \* \*